US012627064B2

(12) United States Patent
Kanios et al.

(10) Patent No.: US 12,627,064 B2
(45) Date of Patent: May 12, 2026

(54) RADIATION PATTERN SHAPING OF RADIATING ELEMENT BY HOUSING MODEL PROVIDING DEFLECTING WAVE FEATURES

(71) Applicant: Aptiv Technologies AG, Schaffhausen (CH)

(72) Inventors: Piotr Kanios, Cracow (PL); Łukasz Baruś, Cracow (PL); Karol Zimolag, Daromin (PL); Mateusz Pulapa, Dobczyce (PL); Przemyslaw Piprek, Libertow (PL)

(73) Assignee: Aptiv Technologies AG, Schaffhausen (CH)

( * ) Notice: Subject to any disclaimer, the term of this patent is extended or adjusted under 35 U.S.C. 154(b) by 56 days.

(21) Appl. No.: 18/646,160

(22) Filed: Apr. 25, 2024

(65) Prior Publication Data

US 2024/0364015 A1 Oct. 31, 2024

(30) Foreign Application Priority Data

Apr. 28, 2023 (EP) .................................... 23170761

(51) Int. Cl.
*H01Q 13/20* (2006.01)
*H01Q 21/06* (2006.01)

(52) U.S. Cl.
CPC ......... *H01Q 13/206* (2013.01); *H01Q 21/064* (2013.01)

(58) Field of Classification Search
CPC ...... H01Q 13/206; H01Q 21/064; H01Q 1/32; H01Q 15/14; H01Q 19/104; H01Q 19/106; H01Q 15/18; H01Q 1/42; H01Q 1/22; H01Q 1/325; H01Q 1/38; H01Q 1/52
See application file for complete search history.

(56) References Cited

U.S. PATENT DOCUMENTS

| | | | | |
|---|---|---|---|---|
| 10,564,202 | B2 * | 2/2020 | Schrattenecker .. | G01R 31/2822 |
| 2009/0066590 | A1 | 3/2009 | Yamada | |
| 2014/0266921 | A1 | 9/2014 | Joshi | |

FOREIGN PATENT DOCUMENTS

| | | | |
|---|---|---|---|
| CN | 103579752 | A | 2/2014 |
| WO | 0141256 | A1 | 6/2001 |

OTHER PUBLICATIONS

English translation of CN 103579752 (Year: 2014).*
Extended European Search Report for EP23170761.3 dated Oct. 4, 2023, 10 pages.

* cited by examiner

*Primary Examiner* — Seung H Lee
(74) *Attorney, Agent, or Firm* — Miller Johnson

(57) ABSTRACT

An antenna system includes a board with an antenna configured to radiate power and a housing. The housing surrounds the board and is configured to protect the board from an environment. The housing includes an opening with at least one metallic wall extending towards the board. The at least one metallic wall is configured to redirect the power radiated by the antenna into a predetermined system radiation direction and in a predetermined radiation pattern.

17 Claims, 4 Drawing Sheets

RADIATION PATTERN SHAPING OF RADIATING ELEMENT BY HOUSING MODEL PROVIDING DEFLECTING WAVE FEATURES

CROSS-REFERENCE TO RELATED APPLICATIONS

This application claims priority to EP 23 170 761 filed Apr. 28, 2023, the entire disclosure of which is incorporated by reference.

FIELD

The present invention generally relates to an antenna system, and specifically relates to an antenna system with a microstrip, strip line or stamped metal antenna radiating element arrangement and a design of its housing in such a way that increased performance of radiating signal is achieved.

BACKGROUND

In recent years the development of modern wireless systems, such as automotive connectivity, caused interest in advanced antenna technology, a radiating element such as a microstrip radiating element or antenna radiating element such as microstrip, strip line, stamped metal antenna (the terms may be used interchangeably) is used.

Such microstrip radiating elements or antennas, strip line, stamped metal antenna are arranged on a board such as a printed circuit board to enable electronic components such as a microchip to radiate and receive radio signals for wireless communication. To protect the system constituted by antenna, board and electronic components, a plastic housing is typically provided to surround the system.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A generic antenna design does however radiate power in no particular direction making it not feasible for long range communication. A specific antenna design has thus been conceived to better direct the radiated power. This specific antenna design improves directionality, but there is however still an issue of antenna efficiency in case of some applications at long range. An alternative solution is to provide an antenna array with a plurality of radiating elements or antennas and to use beam-forming methods to direct the radiated power. This solution does however require complex radio signal control.

Therefore, the present disclosure has an object to address the technical problems of the prior art. The subject-matter of the independent claims solves these problems. The dependent claims describe further embodiments, and this description exemplifies how to carry out the present invention.

Generally, the proposed solution according to the present disclosure involves a housing model to re/direct radiated power and/or to modify the radiation pattern of the antenna in such a way to improve gain of the antenna in desired direction and to improve coverage by the signal at a long range compared to the case without the housing and its de-/reflecting features. Simultaneously, it leads to miniaturization since the housing model is used to increase the gain of the antenna instead of using an antenna with a larger aperture or complex design.

Specifically, according to a first aspect of the present invention there is provided an antenna system comprising a board with an antenna configured to radiate power, a housing surrounding the board and configured to protect the board from an environment. Herein the housing comprises an opening with at least one metallic wall extending towards the board, and the at least one metallic wall is configured to redirect the power radiated by the antenna into a predetermined system radiation direction in a predetermined radiation pattern.

According to a second aspect of the present invention the antenna is an omnidirectional antenna configured to radiate power in all directions perpendicular to a predetermined antenna axis e.g., azimuthal directions.

According to a third aspect of the present invention the antenna is a directional antenna configured to radiate power in a predetermined antenna radiation direction/s perpendicular to a predetermined antenna axis.

According to a fourth aspect of the present invention a surface of the at least one metallic wall is parallel to the predetermined antenna axis.

According to a fifth aspect of the present invention the opening comprises at least two metallic walls extending towards the board. Herein the at least two metallic walls form an edge with an angle between the at least two metallic walls that is smaller than 180°, ideally is greater than or equal to 45° smaller than or equal to 135°, more ideally smaller than or equal to 90°.

According to a sixth aspect of the present invention the at least one metallic wall extends towards the board with a predetermined angle relative to a top surface of the board, the predetermined angle being an angle greater than or equal to 45° and smaller than or equal to 135°, and more ideally being an angle of 90°.

According to a seventh aspect of the present invention the at least one metallic wall extends towards the board up to a predetermined spacing from the antenna and/or board.

According to an eight aspect of the present invention the opening is configured to expose the antenna when seen from a plan view.

According to a ninth aspect of the present invention the housing and/or the at least one metallic wall are/is electrically connected to an electrical ground of the board.

According to a tenth aspect of the present invention the antenna is configured to emit radio waves in a frequency band of 2.4 GHz to 2.85 GHz.

According to an eleventh aspect of the present invention the opening is provided at an edge of the housing and is constituted by three metallic walls extending towards the board.

According to a twelfth aspect of the present invention the board comprises a plurality of antennas, each configured to radiate power. Herein, the housing comprises a plurality of openings, each of a respective one of the plurality of openings being arranged for a corresponding one of each of the plurality of antennas, each of the plurality of openings has at least one metallic wall extending towards the board, and the at least one metallic wall of each of the plurality of openings is configured to redirect the power radiated by the corresponding antenna into a predetermined system radiation direction in a predetermined radiation pattern.

According to a thirteenth aspect of the present invention there is provided an automotive vehicle comprising the antenna system according to any one of the above aspects.

According to a fourteenth aspect of the present invention there is provided a method of manufacturing a housing for surrounding a board of an antenna system, the housing being configured to protect the board from an environment, wherein the method comprises providing a location of the board and an antenna of the board, providing a manufacturing technology for providing the housing, wherein the manufacturing technology comprises a structure for forming the housing with an opening having at least one metallic wall extending towards the location of board, and wherein the at least one metallic wall is configured to redirect power to be radiated by the antenna into a predetermined system radiation direction in a predetermined radiation pattern, and supplying a material to the manufacturing technology.

As a result, it is possible to use the deflection of radio waves to reinforce the radio signal instead of using an antenna with a larger aperture. Such an antenna with a larger aperture would cover a larger area of the board reducing the space for electronic components if the board is not extended. Thereby, it is possible to miniaturize the entire antenna or radio system whilst increasing performance of the antenna in the desired direction. Material, costs and energy savings may also be significant, especially if the antenna is an on-board antenna.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The following description explains the present invention in reference to the figures. Herein, elements of the figures representing similar, or the same features of the present invention are labeled with the same or corresponding reference signs. The figures illustrate the present invention by use of a three-dimensional drawings with respect to an x-, y- and z-direction. These directions may respectively be indicated by an x-, y-, and z-axis in the figures. It is worth noting that this indication is for better understanding the present invention only and does not limit the orientation, shape or scale of any feature of the present invention.

The present invention makes use of an appropriate microstrip, strip line or stamped metal antenna radiation or radiating element or antenna distribution and of a design of a housing with a de-/reflecting feature that reinforce radiated waves to re/direct the radiated power and/or to modify the radiation pattern. As a result, coverage of signal among longer distance can be achieved without the use of antennas with larger aperture which could mean taking up more space.

Figure 1:
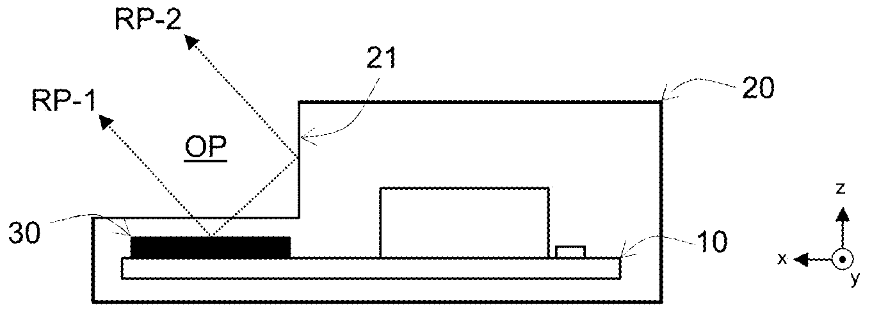
FIG. 1 illustrates a cross-sectional view of an antenna system according to the present invention.

In this regard, FIG. 1 illustrates a cross-sectional view of an antenna system or radio system (the terms may be used interchangeably) according to the present invention. Specifically, the antenna system comprises a board 10 with an antenna 30 configured to radiate power, and a housing 20 surrounding the board 10 configured to protect the board 10 from an environment. Herein the housing 20 comprises an opening OP with at least one metallic wall 21 extending towards the board 10, and the at least one metallic wall 21 is configured to redirect the power radiated by the antenna 30 into a predetermined system radiation direction in a predetermined radiation pattern.

In this context, the board 10 may be a printed circuit board, an antenna board or any other substrate capable of carrying, supporting or holding an antenna 30. The antenna 30 may be a microstrip antenna, an antenna formed from circuit board traces, or an antenna mounted to the board 10, a microstrip, strip line, or stamped metal antenna. The housing 20 or casing (the terms may be used interchangeably) or parts thereof, like the metallic inserts explained further below, may be of any material featuring a high or close to perfect dielectric conductance or dielectric constant. Herein, the term “metallic” may mean that only some part, parts or the entirety of the at least one wall 21 and/or of the housing 30 is made from metal, metallic material or a material with high dielectric conductance or dielectric constant. The opening OP may be a cutout, a hole, or an absence of housing material. Herein the wall material and/or housing material may be from metal, metallic material or material with high dielectric conductance or dielectric constant. This may mean the opening OP is “open” with respect to radio waves, but is physically “closed” or covered by other material/s including non-metallic material/s, such as plastic or any other material featuring a low or close to zero dielectric conductance or dielectric constant. In this regard, the opening OP may be configured to expose or uncover the antenna 30 when seen from a plan view e.g., when observing the antenna system from a z-direction. It may be ideal that the housing 20 and/or the at least one metallic wall 21 are/is electrically connected to an electrical ground of the board 10.

It is worth noting that the metallic wall/s described herein may be fully manufactured from a metallic material, may be plated or covered by a metallic material, or may comprise or include metallic material e.g., covered by non-metallic material for protection or aesthetics, to provide the redirecting and shaping of the radiation pattern of the antenna 30 into the predetermined radiation pattern.

Further in this context, the at least one metallic wall 21 may be a protrusion, lip or extension of or at an edge of the opening. Whilst the housing 20 may be of a non-metal material, the at least one metallic wall 21 is of a metal or a material with high dielectric conductance or dielectric constant. The at least one metallic wall 21 may extend towards the board 10, by having at least one surface that would intersect the board 10 if extended in a direction parallel to the surface. That is to say e.g., the surface of any metallic wall of the housing 20 depicted in FIG. 1, that is not the at least one metallic wall 21 described above, would not intersect the board 10 when extended parallel to the surface.

Herein, the antenna 30 may be an omnidirectional antenna configured to radiate essentially equal power in all directions perpendicular to a predetermined antenna axis. The radiation pattern of an omnidirectional antenna when plotted on a plane intersecting the antenna is symmetrical in radiation directions. In this case, the predetermined antenna axis may be parallel to the y-direction, such that the radiation pattern wraps around the predetermined antenna axis to radiate essentially equal power into all directions around this axis.

As an alternative to an omnidirectional antenna, the antenna 30 may be a directional antenna configured to radiate power essentially predominantly in a predetermined antenna radiation direction perpendicular to a predetermined antenna axis. Herein, the "essentially predominantly" is to say that, although an ideal directional antenna would radiate power in only a single direction, a physical antenna always radiates at least some power in all directions. Nonetheless, a physical directional antenna is designed to radiate power in predominantly one so-called antenna radiation direction perpendicular to the antenna axis. In this case, the antenna radiation direction may be a direction perpendicular to the y-direction, which means that the antenna axis of a directional antenna may be parallel to the y-direction.

Regardless of the directionality of the antenna 30, it may be configured to emit radio waves in a frequency band of (inclusively) 2.4 GHz to 2.85 GHz e.g., a frequency band of 2.442 GHz. Thereby, the antenna 30 may be used for emitting and receiving radio waves carrying information for WLAN, WiFi and/or Bluetooth communication.

Returning to FIG. 1, the directions in which an omnidirectional antenna or a directional antenna may radiate power may be any direction perpendicular to the y-direction. As a result, power may be radiated by the antenna 30 in a direction following a radiation path RP-1, as illustrated in FIG. 1 by a dotted line. This radiation path RP-1 may face in a predetermined system radiation direction e.g., in a direction perpendicular to the y-direction and between the x- and z-direction. Further, power may be radiated by the antenna 30 in another direction following another radiation path RP-2 as illustrated in FIG. 1 by a dotted line. Power radiated along this other radiation path RP-2 may be redirected by the at least one metallic wall 21 into the predetermined system radiation direction. By redirecting part of the power radiated by the antenna 30 as illustrated in FIG. 1, a predetermined radiation pattern may be achieved, too.

Specifically, a higher power or gain may be achieved in the positive x-direction in comparison to the negative x-direction. E.g., a specific embodiment of a housing 20 that protects an antenna 30 may result in a maximum directional gain of 4.86 dB in comparison to a maximum omnidirectional gain of 1.79 dB that would be achieved without such a housing 20 or when using a traditional plastic housing.

Maximum and minimum gains for a plurality of various applications have been recorded for 2.4 GHz, 2.442 GHz and 2.485 GHz in the following table. Herein, the difference between an increased maximum gain e.g., in the predetermined system radiation direction, and a reduced minimum gain e.g., in a direction different to the predetermined system radiation direction, becomes apparent.

| CASE | min. Gain [dB] | max. gain [dB] |
|---|---|---|
| XY @ 2.4 GHz | −13.9918 | 2.2653 |
| XZ @ 2.4 GHz | −13.9918 | 2.2653 |
| YZ @ 2.4 GHz | −15.2775 | 4.0365 |
| XY @ 2.442 GHz | −9.3846 | 2.2351 |
| XZ @ 2.442 GHz | −9.3846 | 2.2351 |
| YZ @ 2.442 GHz | −12.0214 | 3.5839 |
| XY @ 2.485 GHz | −11.6393 | 3.1891 |
| XZ @ 2.485 GHz | −11.6393 | 3.1891 |
| YZ @ 2.485 GHz | −23.1755 | 2.9784 |

From these comparative cases, it can be seen that the surface of the at least one metallic wall 21 forming the opening OP of the housing 20 may re/direct energy radiated or emitted by the antenna 30 in the predetermined system radiation direction. Thereby, the whole antenna system remains protected and becomes directionally optimized despite the antenna 30 not emitting energy predominantly in the predetermined system radiation direction. Further, it can be seen that the surface of the at least one metallic wall 21 forming the opening OP of the housing 20 may re/shape the radiation pattern of the antenna 30 into the predetermined radiation pattern. Thereby, whole antenna system can emit radio waves into an environment that is shaped a predetermined way despite the antenna 30 not being optimized for covering perfectly covering the environment. As a result, it is no longer necessary to manufacture different antennas with specific antenna shapes designed for specific applications of the antenna system. Instead, the present invention makes use of the structure of the opening OP of the protective housing 20 to cause the radiated energy to propagate in a way meeting the deployment requirements of the antenna system.

Further various embodiments regarding shape of the opening OP, arrangement of the at least one metallic wall 21 and antenna 30 within the housing 30 are explained next.

A surface of the at least one metallic wall 21 may be essentially parallel to the predetermined antenna axis. Thereby, the redirecting of power radiated by the antenna 30 into the predetermined system radiation direction is maximized. E.g., the at least one metallic wall 21 depicted in FIG. 1 may extend in a y-direction and the antenna axis may be parallel to the y-direction.

Although FIG. 1 depicts the at least one metallic wall 21 as extending towards the board with/at an angle of essentially 90°, the present invention is not limited thereto. That is to say, the at least one metallic wall 21 may extend towards the board 10 with a predetermined angle relative to a top surface of the board 10. Herein the predetermined angle may be an angle greater than or equal to 45° and smaller than or equal to 135°, and may more ideally be an angle of 90°. Put differently, the exact angle may be chosen based on the relationship of position and alignment between antenna 30 and the at least one metallic wall 21.

Further, the at least one metallic wall 21 may extend towards the board 10 up to a predetermined spacing from the antenna 30 and/or the board 10. That is to say, a gap may exist between the at least one metallic wall 21 and the antenna 30 and/or board 10. This gap may be to avoid a short circuit if the material of the metallic wall is electrically conductive. This gap may be to avoid impacting the power radiation behavior of the antenna 30, as a contact with the antenna 30 may change its antenna design. After all, the at least one metallic wall 21 may be to redirect power radiated by the antenna 30 and may not be part of the antenna design as such.

Figure 2A:
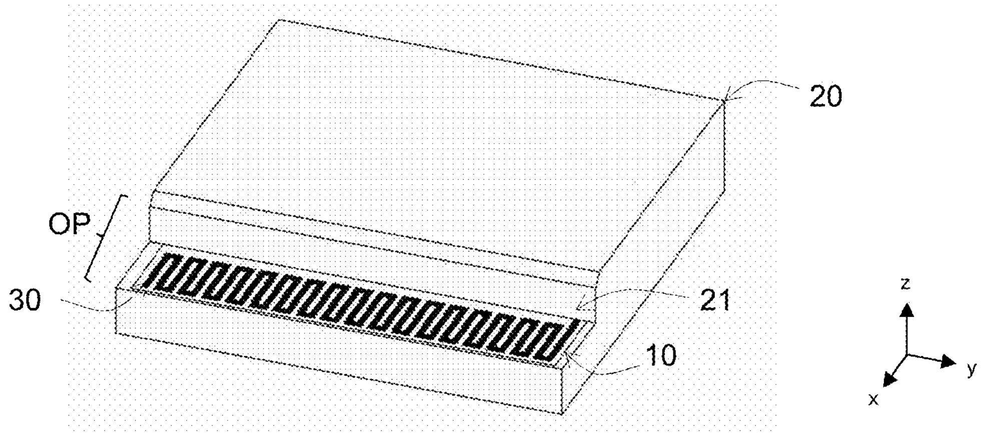
FIG. 2A illustrates an antenna system according to the present invention.
Figure 2B:
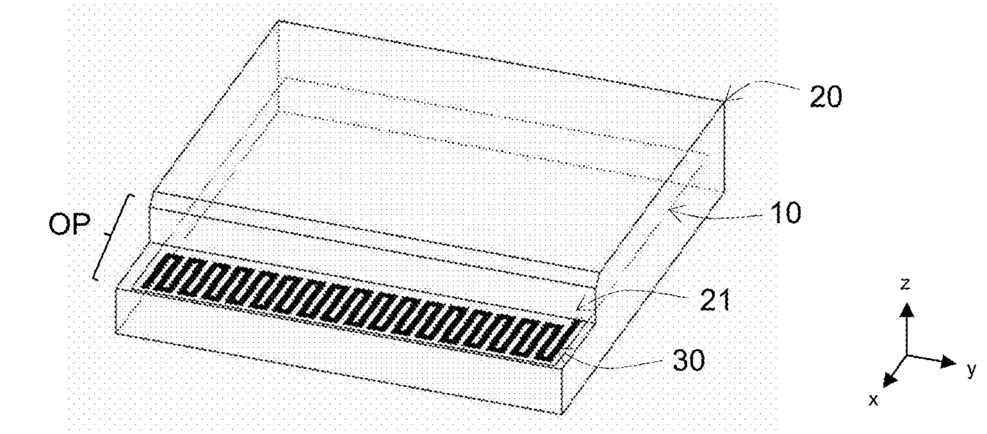
FIG. 2B illustrates the antenna system of FIG. 2A with features inside the housing visible.

FIGS. 2A and 2B illustrate a three-dimensional view of an antenna system according to the present invention. Herein, the antenna 30 may extend along an antenna axis e.g., parallel to the y-direction, and may radiate power in one or more directions perpendicular to the y-direction. The housing 20 may comprise the at least one metallic wall 21 extending towards the board 10, which is partially covered by the housing 20. This partial covering is exemplified in FIG. 2B, illustrating that the board 10 may extend into the housing 20. That is to say, the housing 20 may comprise an opening OP such as a ridge or lip for uncovering the antenna 30 from material being of a metal or of a material with high dielectric conductance or dielectric constant.

In addition to FIG. 1, in FIGS. 2A and 2B an edge formed by the at least one metallic wall 21 and/or the housing 20 may be chamfered or beveled. This chamfer or bevel may impact the predetermined radiation pattern to improve the power radiation performance or gain of the antenna system.

Figure 3A:
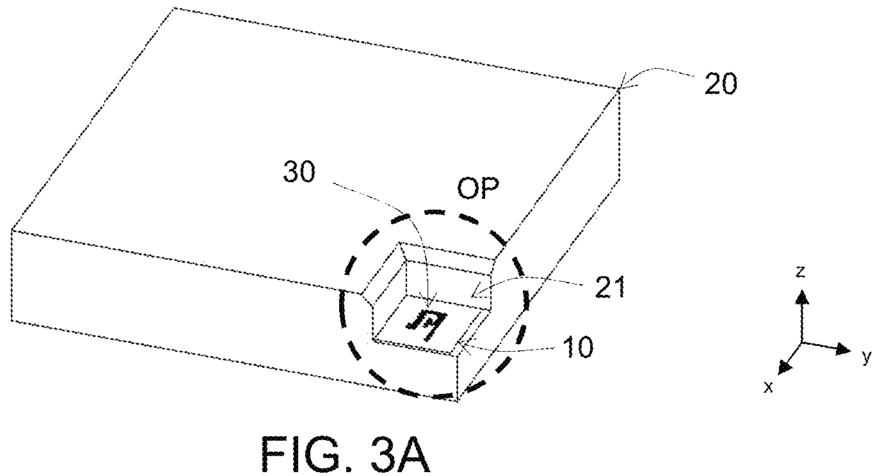
FIG. 3A illustrates an antenna system according to the present invention.
Figure 3B:
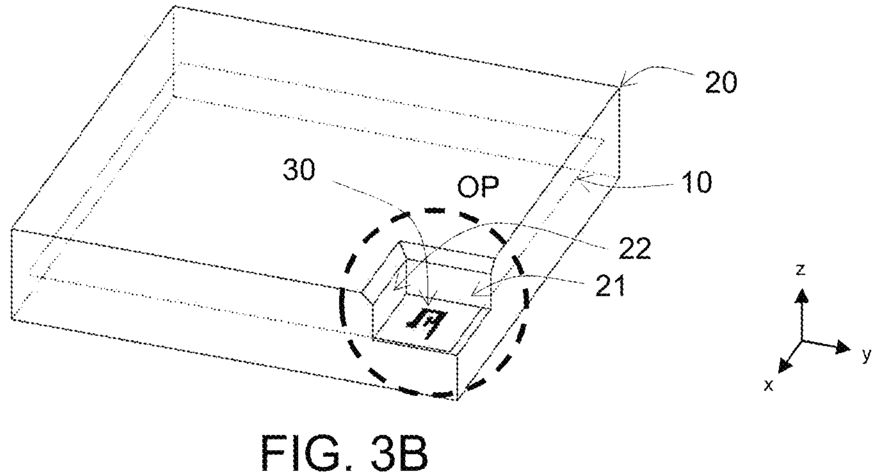
FIG. 3B illustrates the antenna system of FIG. 3A with features inside the housing visible.

As illustrated in FIGS. 3A and 3B, according to another various embodiment, the opening OP may comprise at least two metallic walls 21, 22 extending towards the board 10. Herein the at least two metallic walls 21, 22 may form an edge with an angle between the at least two metallic walls 21, 22 that is smaller than 180°. That is to say, the at least two metallic walls 21, 23 may not be interpreted as two areas of the same essentially flat pr plane surface of a single metallic wall. Although the at least two metallic walls 21, 22 in FIGS. 3A and 3B are arranged perpendicular to each other, the angle at the edge of the at least two metallic walls 21, 22 may not be limited to 90°. That is to say, the angle may be greater than or equal to 45° and smaller than or equal to 135°, and more ideally may be smaller than or equal to 90°. By providing the at least two metallic walls 21, 22 at an angle, power radiated by the antenna 30 may be redirected into a predetermined system radiation direction in a positive x-, y- and z-direction. Similar to the case of providing at least one metallic wall 21, the at least two metallic walls 21, 22 may be of a material that is metal or has a high dielectric conductance or dielectric constant. Similarly, and as exemplified in FIGS. 3A and 3B, the edge formed between the housing 20 and the at least two metallic walls 21, 22 may be beveled or chamfered. Similarly, the angles with which each of the at least two metallic walls 21, 22 extend towards the board 10 may be different to the 90° illustrated in FIGS. 3A and 3B. Similarly, the board may extend into the housing 20 as illustrated in FIG. 3B.

Figure 4A:
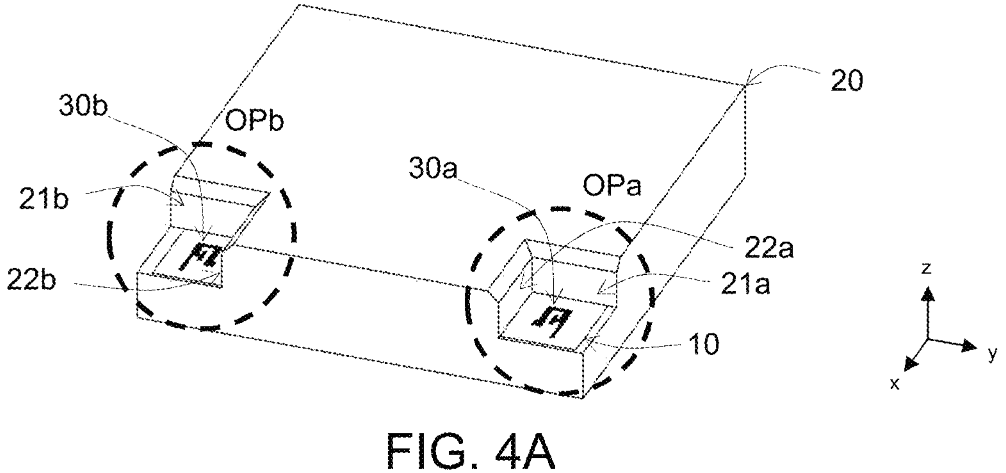
FIG. 4A illustrates an antenna system according to the present invention.
Figure 4B:
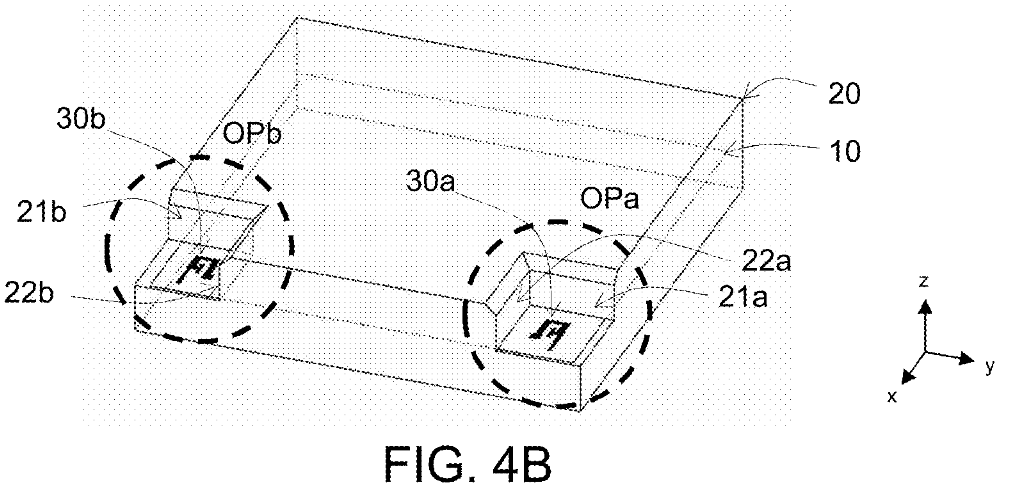
FIG. 4B illustrates the antenna system of FIG. 4A with features inside the housing visible.

Although examples only depicted a single opening OP as part of the antenna system, the present invention is not limited thereto. That is to say e.g., as illustrated in FIGS. 4A and 4B, the board may comprise a plurality of antennas 30*a*, 30*b*, each configured to radiate power, wherein the housing 20 may comprises a plurality of openings OPa, OPb, each of a respective one of the plurality of openings OPa, OPb being arranged for a corresponding one of each of the plurality of antennas 30*a*, 30*b*. Herein, each of the plurality of openings OPa, OPb may have at least one metallic wall 21*a*, 21*b*, 22*a*, 22*b* extending towards the board 10, wherein the at least one metallic wall 21*a*, 21*b*, 22*a*, 22*b* of each of the plurality of openings OPa, OPb may be configured to redirect the power radiated by the assigned corresponding antenna 30*a*, 30*b* into a predetermined system radiation direction in a predetermined radiation pattern. The plurality of openings OPa, OPb is not limited to an opening in a corner of the housing 20 as illustrated in FIGS. 4A and 4B. E.g., a ridge or lip like opening OP of FIGS. 1, 2A and 2B may be provided on two sides of the housing 20 uncovering two antennas 30 provided on two sides of the board 10. By providing a plurality of openings OPa, OPb, power radiated by each of the antennas 30*a*, 30*b* may be redirected into a plurality of predetermined system radiation directions e.g., in a positive x-, y- and z-direction like in FIGS. 3A and 3B, and in a negative y-direction and positive x- and z-direction.

Figure 5A:
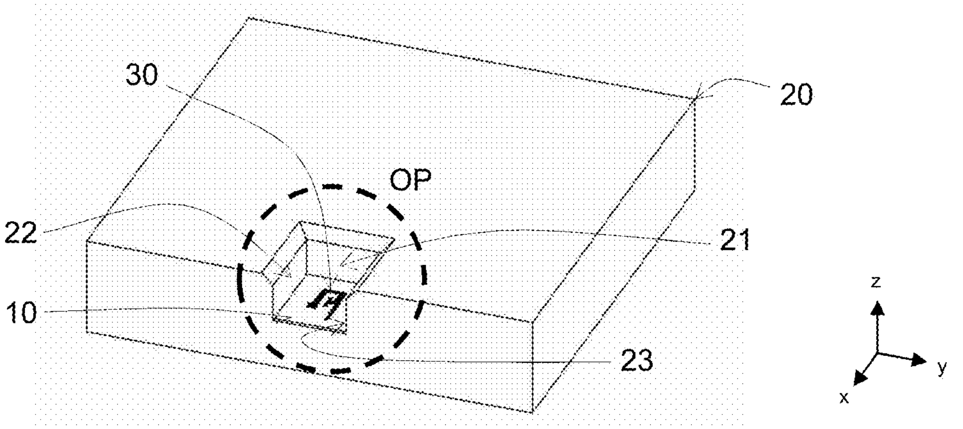
FIG. 5A illustrates an antenna system according to the present invention.
Figure 5B:
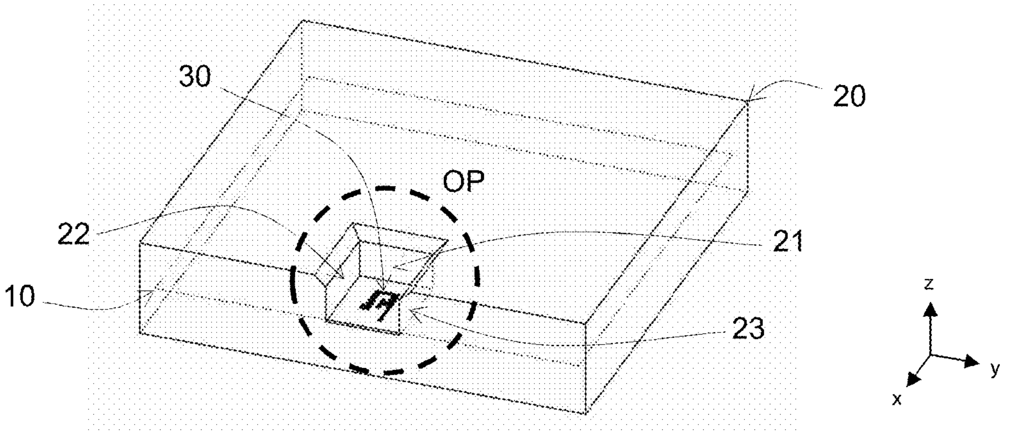
FIG. 5B illustrates the antenna system of FIG. 5A with features inside the housing visible.

Whilst the previous examples illustrate the opening OP as being provided along an entire edge i.e., from corner to corner of the housing 20, or in at least one corner of the housing 20, the present invention is not limited thereto. That is to say, as illustrated in FIGS. 5A and 5B, the opening OP may be provided at an edge of the metal housing 20 and may be constituted by three metallic walls 21, 22, 23 extending towards the board 10. Herein the at least one, two or three metallic walls 21, 22, 23 may be configured to form a box shaped opening in the housing 20. This box shaped opening OP may also be referred to as a "chimney" and may achieve the same benefits as the corner, ridge or lip like openings OP that have been discussed above. E.g., the housing 10 of FIGS. 5A and 5B may improve focusing and amplifying of power radiated by the antenna 30 in the predetermined system radiation direction. Put differently, this focus and amplification of power may be achieved when it is redirected by the at least one metallic wall 21, 22, 23 of the housing 20 illustrated in FIGS. 5A and 5B.

Figure 6A:
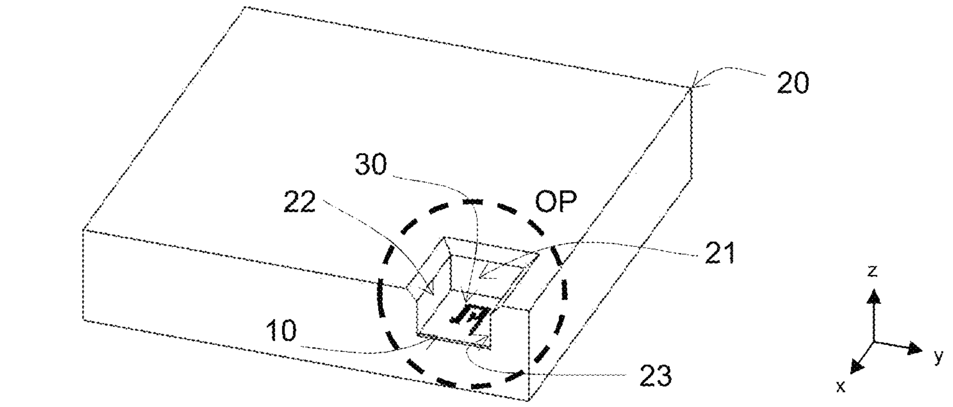
FIG. 6A illustrates an antenna system according to the present invention.
Figure 6B:
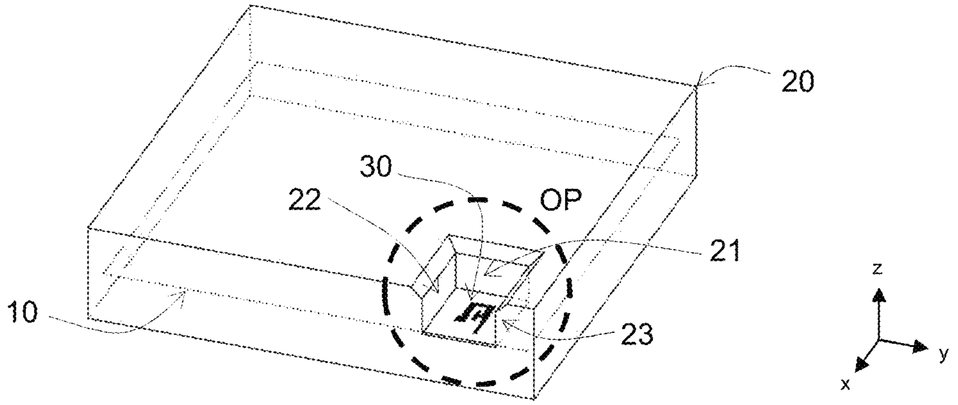
FIG. 6B illustrates the antenna system of FIG. 6A with features inside the housing visible.

Although the opening OP is illustrated in FIGS. 5A and 5B as being positioned in the middle of the housing 20, the present invention is not limited thereto. That is to say, the opening OP may be provided anywhere along an edge of the housing 20 e.g., as shown in FIGS. 6A and 6B, and may be constituted by three metallic walls 21, 22, 23 similar to those illustrated in FIGS. 5A and 5B.

Further, the dimensioning of the opening OP may be in the range of 10 mm to 50 mm (inclusively). E.g., when focusing on the opening OP having three metallic walls 21, 22, 23 like in FIGS. 5A to 6B, the first (rear) metallic wall 21 may be a metallic wall essentially on a YZ-plane, and the second (left) metallic wall 22 and the third (right) metallic wall 23 may be metallic walls on either side of the first (rear) metallic wall 21 essentially on a XZ-plane.

Herein "essentially on" may mean that the metallic wall may be essentially parallel to the plane, but the alignment of the metallic wall is not limited thereto. That is to say, the metallic wall may be tilted by an angle relative to the plane e.g., to no longer extend towards the board 10 with an angle of 90° and/or to no longer form an edge with an adjacent metallic wall at an angle of 90°.

Returning to the dimensioning of the three metallic walls 21, 22, 23 they may be rectangular with a side length from 10 mm to 50 mm (inclusively). As a red embodiment, the metallic walls 21, 22, 23 may be square shaped with a side length of 40 mm to 42 mm (inclusively). If the top edge of the metallic walls i.e., where the opening OP interfaces with the rest of the housing 20, is chamfered or beveled i.e., as illustrated in FIGS. 5A to 6B, the essentially flat surfaces of the metallic walls may ideally extend by e.g., 32 mm in the Z-direction to accommodate the chamfer or bevel.

Further, when seen from a above i.e., along the Z-axis, the antenna 20 may be positioned essentially in the center of the opening OP. Herein, if the opening OP has a simple geometric shape when seen from above e.g., is a rectangle or square, the center of the opening OP may coincide with the center of the geometric shape. The present invention is however not limited thereto. That is to say, the antenna 30 may be positioned closer to any of the metallic walls 21, 22, 23 whilst remaining uncovered by opening OP of the housing 20 when seen from above. E.g., when returning to the opening OP having three metallic walls 21, 22, 23 like in FIGS. 5A to 6B, the center of the antenna 30 may be positioned 15 mm from the first (rear) metallic wall 21, 27.4 mm from the second (left) metallic wall 22 and 12.7 mm from the third (right) metallic wall 23.

Further, the angles at the edges formed by the three metallic walls 21, 22, 23 may be 90° as shown in FIGS. 5A, 5B, 6A and 6B, but they may be different, like discussed above in reference to the corner opening OP illustrated in FIGS. 3A, 3B, 4A and 4B. Similarly, the angle with which each of the three metallic walls 21, 22, 23 may extend towards the board 10 may be different to 90°, too e.g., like the "predetermined angle" discussed above in reference to FIG. 1. By choosing specific, predetermined and/or possibly different angles for the edges between the metallic walls 21, 22, 23 and by choosing specific, predetermined and/or possibly different angles with which the metallic walls 21, 22, 23 extend towards the board 10, power emitted by the antenna 30 may be better redirected and/or focused in the predetermined system radiation direction. Further and e.g., based on the environment in which the antenna system may be deployed, a predetermined radiation pattern optimized for the environment may be obtained.

It is to be noted that the housing 20 does not need to be provided as a fully metallic housing 20. That is to say, the antenna system may comprise a housing 20 that is constituted by a metallic insert providing the opening OP with the at least one metallic wall 21 extending towards the board 10. This metallic insert may be provided as a standalone component and may be inserted into a (also non-metallic) housing featuring a reception point for the metallic insert. Therefore, the metallic insert comprises a structure which is capable of redirecting power to be radiated by the antenna 30 into the predetermined system radiation direction and in a predetermined radiation pattern. This means it is not necessary to provide a fully metallic housing and instead only multi-purpose metallic insert need be produced. Thereby, the complexity of the manufacturing process is reduced and more applications can be covered, since only a single type of metallic insert needs to be manufactured which can be applied to a plurality of different housings, featuring at least one reception point for the metallic insert.

For example, ridge metallic insert may be provided for types of (non-metallic) housing to result in an assembled housing as depicted in FIGS. 2A and 2B. Also, a corner metallic insert may be provided for types of (non-metallic) housing to result in assembled housings as depicted in FIG. 3A to 4B. Also, a chimney metallic insert may be provided for types of (non-metallic) housing to result in assembled housings as depicted in FIG. 5A to 6B. Therefore, requirements for accurate manufacturing may be limited to the metallic insert e.g., inside the dashed circle of FIG. 3A to 6B, and a different manufacturing may be used for the remainder of the housing 20. Therefore, the metallic inserts may act as deflective metallic walls even in a case where an otherwise plastic housing is provided. This approach is also ideal in scenarios where a full shielding is not essential, but where an antenna with a radiation pattern that needs to be redirected and/or reshaped is provided on board. That is to say, the metallic insert may be to redirect and reshape the radiation pattern by providing a metallic portion of the (assembled) housing featuring 1, 2, 3 or 4 metallic walls that extend towards the board. Also, a plurality of inserts may be combined to form the opening OP. E.g., two ridge metallic inserts may be provided to form a corner opening OP as depicted in FIG. 3A to 4B or three ridge metallic inserts may be provided to form a chimney opening OP as depicted in FIG. 5A to 6B.

To this end, an automotive vehicle may comprise the antenna system described above. Therefore, by achieving a predetermined radiation pattern in a predetermined system radiation direction would maximize the coverage of the antenna system within the automotive vehicle without risking radio leakage outside the automotive vehicle. Further, if the antenna system is used for communication outside the vehicle, its communication range may be improved whilst reducing the risk of emitting interfering radio waves into the inside of the automotive vehicle.

Another various embodiment of the present invention is a method of manufacturing a housing 20 for surrounding a board 10 of an antenna system e.g., as described above. Herein, the housing 20 is configured to protect the board 10 from an environment, and the method comprises providing a location of the board 10 and an antenna 30 of the board, providing a manufacturing technology for providing the housing 20, and supplying a metallic material to the manufacturing technology. Herein the manufacturing technology comprises a structure for forming the housing 20 with an opening OP having at least one metallic wall 21 extending towards the location of board 10, and the at least one metallic wall 21 is configured to redirect power to be radiated by the antenna 30 into a predetermined system radiation direction in a predetermined radiation pattern.

In this context, the manufacturing technology may be any one of injection molding, die casting, plate joining, pressing or similar. That is to say, the manufacturing technology may be any one technology capable of providing a housing 20 featuring a structure with an opening OP that has at least one metallic wall 21 extending towards the location of a board 10 for which the housing 20 is provided.

For example, a die casting or molding process may be employed to form the housing 20 of the present invention. Other methods of manufacturing may be equally suitable such as welding or adhering sheets of metallic and/or non-metallic material to form the housing 20, or machining the housing 20 from metallic and/or non-metallic material. Because die casting or molding involves fewer manufacturing steps it is the ideal method of manufacturing.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. An antenna system comprising:
- a board with an antenna configured to radiate power; and
- a housing surrounding the board and configured to protect the board from an environment, wherein:
  - the housing includes an opening provided at an edge of the housing with at least one metallic wall extending towards the board up to a predetermined spacing from the board,
  - the at least one metallic wall is configured to redirect the power radiated by the antenna into a predetermined system radiation direction and in a predetermined radiation pattern,
  - the opening is configured to expose the antenna when seen from a plan view, and
  - at least one of the housing or the at least one metallic wall is electrically connected to an electrical ground of the board.

2. The antenna system of claim 1 wherein the antenna is an omnidirectional antenna configured to radiate power in all directions perpendicular to a predetermined antenna axis.

3. The antenna system of claim 1 wherein the antenna is a directional antenna configured to radiate power in a predetermined antenna radiation direction perpendicular to a predetermined antenna axis.

4. The antenna system of claim 2 wherein a surface of the at least one metallic wall is parallel to the predetermined antenna axis.

5. The antenna system of claim 1 wherein:
- the opening includes at least two metallic walls extending towards the board;
- the at least two metallic walls form an edge; and
- an angle between the at least two metallic walls is less than 180 degrees.

6. The antenna system of claim 1 wherein:
- the at least one metallic wall extends towards the board with a predetermined angle relative to a top surface of the board; and
- the predetermined angle is greater than or equal to 45 degrees.

7. The antenna system of claim 1 wherein the antenna is configured to emit radio waves in a frequency band of 2.4 GHz to 2.85 GHz.

8. The antenna system of claim 1 wherein the opening is provided at an edge of the housing and is constituted by one, two, three, or four metallic walls extending towards the board.

9. The antenna system of claim 8 wherein each metallic wall is planar having a four sided shape of an area from a point of view perpendicular to a respective metallic wall.

10. The antenna system of claim 1 wherein:
- the board includes a plurality of antennas;
- each antenna of the plurality of antennas is configured to radiate power;
- the housing includes a plurality of openings;
- each opening of the plurality of openings is arranged for a corresponding antenna of the plurality of antennas;
- each opening of the plurality of openings has at least one metallic wall extending towards the board, and
- the at least one metallic wall is configured to redirect the power radiated by a corresponding antenna into a predetermined system radiation direction and in a predetermined radiation pattern.

11. The antenna system of claim 1 wherein the housing is constituted by a metallic insert providing the opening with the at least one metallic wall extending towards the board.

12. An automotive vehicle comprising:
- the antenna system of claim 1.

13. The antenna system of claim 1 wherein the at least one metallic wall is electrically connected to the electrical ground of the board.

14. The antenna system of claim 1 wherein the at least one metallic wall and the board define a gap therebetween.

15. A method of manufacturing a housing for surrounding a board of an antenna system, the housing configured to protect the board from an environment, the method comprising:
- providing a location of the board and an antenna of the board;
- providing a manufacturing technology for providing the housing; and
- supplying a metallic material to the manufacturing technology, wherein:
  - the manufacturing technology includes a structure for forming the housing with an opening provided at an edge of the housing and having at least one metallic wall extending towards the location of the board up to a predetermined spacing from the board,
  - the at least one metallic wall is configured to redirect power to be radiated by the antenna into a predetermined system radiation direction in a predetermined radiation pattern,
  - the opening is configured to expose the antenna when seen from a plan view, and
  - at least one of the housing or the at least one metallic wall is electrically connected to an electrical ground of the board.

16. The method of claim 15 wherein the at least one metallic wall is electrically connected to the electrical ground of the board.

17. The method of claim 15 wherein the at least one metallic wall and the board define a gap therebetween.

* * * * *